(12) United States Patent
Bunce et al.

(10) Patent No.: US 6,987,761 B2
(45) Date of Patent: Jan. 17, 2006

(54) INBOUND DATA STREAM CONTROLLER WITH PRE-RECOGNITION OF FRAME SEQUENCE

(75) Inventors: Robert M. Bunce, Hopewell Junction, NY (US); Louis T. Fasano, Poughkeepsie, NY (US); Christos J. Georgiou, Scarsdale, NY (US); Kevin G. Kramer, Wappingers Falls, NY (US); Brian J. Schuh, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 09/683,777

(22) Filed: Feb. 13, 2002

(65) Prior Publication Data

US 2003/0152073 A1 Aug. 14, 2003

(51) Int. Cl.
*H04L 12/28* (2006.01)
*H04L 12/56* (2006.01)

(52) U.S. Cl. .................. 370/389; 370/391; 370/394; 370/428

(58) Field of Classification Search ........ 370/351–356, 370/402, 374, 394, 475, 471, 470, 412, 392, 370/390, 389, 400, 428, 429, 396; 710/748, 710/749, 750, 757
See application file for complete search history.

(56) References Cited

U.S. PATENT DOCUMENTS

| 5,410,722 | A | | 4/1995 | Cornaby |
| 5,521,916 | A | | 5/1996 | Choudhury et al. |
| 5,590,122 | A | * | 12/1996 | Sandorfi et al. ............ 370/394 |
| 5,606,373 | A | | 2/1997 | Dopp et al. |
| 6,163,540 | A | * | 12/2000 | Cheung et al. ............ 370/394 |
| 6,178,289 | B1 | | 1/2001 | Jang |
| 6,314,100 | B1 | * | 11/2001 | Roach et al. ............... 370/394 |
| 6,314,477 | B1 | * | 11/2001 | Cowger et al. .............. 710/22 |
| 6,597,918 | B1 | * | 7/2003 | Kim .......................... 455/466 |
| 2001/0017858 | A1 | * | 8/2001 | Kamoi et al. |
| 2001/0048681 | A1 | * | 12/2001 | Bilic et al. |

* cited by examiner

*Primary Examiner*—Ajit Patel
(74) *Attorney, Agent, or Firm*—Richard A. Henkler; Dugan & Dugan PC

(57) ABSTRACT

A data communication controller processes incoming data frames. The controller includes a pre-processing block for receiving data frames and a frame processing unit coupled to the pre-processing block. The pre-processing block is configured to compare header fields of a current frame with header fields of a previous frame. The pre-processing block provides an output signal to the frame processing unit on the basis of the comparison of the header fields of the current and previous frames. The controller may operate in accordance with the Fiber Channel protocol, and the output signal may include bits to indicate that the current frame is of the same exchange, of the same sequence, and is next in sequence relative to the previous frame.

12 Claims, 5 Drawing Sheets

INBOUND DATA STREAM CONTROLLER WITH PRE-RECOGNITION OF FRAME SEQUENCE

BACKGROUND OF THE INVENTION

1. Field of the Invention

This invention is concerned with data communication and is more particularly concerned with processing incoming packets of data 2. Background of the Invention A considerable number of data communication protocols have been developed. One protocol which is widely used, for dedicated storage networks and other applications, is the Fibre Channel protocol (e.g., ANSI X3T11 Fibre Channel Standards).

FIG. 1 is a block diagram illustration of a data communication controller arrangement that is suitable for use with the Fibre Channel protocol.

In FIG. 1, a network physical interface block 10 receives an incoming stream of data from a network (not shown). A port logic block 12 is coupled to the physical interface block 10. The inbound data communication stream is passed from the port logic block 12 to an inbound interface block 14, which includes a FIFO (first-in-first-out) pre-buffer 16. The inbound data communication stream proceeds from the inbound interface block 14 to an inbound processing block 18. The inbound processing block 18 includes processing and control logic circuitry 20 and an inbound frame buffer 22. The inbound data that has been buffered in the inbound frame buffer 22 is provided to one or more DMA (direct memory access) engines 24. The DMA engines 24 are in two-way communication with a host system bus (not shown) via a host system bus interface 26.

In the outbound data path, outbound data is provided from the DMA engines 24 to an outbound processing block 28. The outbound processing block 28 includes processing and control logic circuitry 30 and an outbound frame buffer 32.

The outbound data stream continues from the outbound frame buffer 32 to outbound interface block 34, which includes a FIFO post-buffer 36. The outbound data stream continues from the outbound interface block 34 through the port logic 12 and the network physical interface 10 to the data network itself.

Details of processing performed with respect to the inbound data path of a Fibre Channel controller will now be described with reference to FIG. 2. In FIG. 2, block 38, which corresponds to the inbound side of the network physical interface 10 (FIG. 1), represents the "physical layer" (FC-0) of the Fibre Channel protocol. Block 38 performs serial-to-parallel conversion and synchronizes and maintains byte timing.

Block 40 represents the FC1 and FC-AL (arbitrated loop) layers of the Fibre Channel protocol and corresponds to the inbound side of port logic block 12 (FIG. 1). Block 40 performs 10 bit to 8 bit code conversion, compensation for clock timing differences, ordered set decode and loop management. Block 40 also detects errors such as loss of word or byte synchronization, 8b 10b code violation and running disparity error, and recognizes a link reset command.

Block 42 corresponds to frame processing logic that is included in inbound interface block 14 (FIG. 1). Block 42 manages the FIFO prebuffer 16 (FIG. 1) and routes frames to the correct frame buffer depending on frame type. Block 42 also performs error detection functions such as CRC (cyclic redundancy check), maximum frame length, correctness of the destination node ID, detection of a valid end of frame (EOF) sequence and detection of whether the frame is in an unsupported class, i.e., is of a quality of service class that is not supported by the receiving facility.

As shown in FIG. 2, the inbound data path proceeds through blocks 38, 40 and 42 to frame buffers 22. A microprocessor 44 is in communication with the frame buffers 22 and performs software processing on incoming data frames. Microprocessor 44 corresponds to at least part of the processing and control logic circuitry 20 shown in FIG. 1. (The microprocessor 44 may also perform at least some of the functions of the outbound processing and control logic circuitry 30 shown in FIG. 1.)

Microprocessor 44 may be a single processor or multiple processors.

The processing performed by the microprocessor 44 may include reading the headers of the inbound data frames, determining the types of the frames, relating the data frames to exchange context blocks, and managing the frame buffers 22. The microprocessor 44 may also handle communication with a host processor, perform higher level error checking in addition to the error checks performed by blocks 38, 40, 42 and generally control operation of a controller card on which the inbound and outbound control functions are performed.

The following table indicates the format of data frames used in the Fibre Channel protocol.

TABLE 1

Frame Format

| Component | No. of Bytes |
| --- | --- |
| SOF | 4 |
| Header | 24 |
| Data | 0-2112 |
| CRC | 4 |
| EOF | 4 |

In Table 1 "SOF" refers to the start of frame sequence, "CRC" refers to cyclic redundancy check data and "EOF" refers to the end of frame sequence.

The format of the header data in the frames of the Fibre Channel protocol is indicated by the following table.

TABLE 2

Header Format

| Field | No. of Bytes |
| --- | --- |
| R_CTL (Routing Control) | 1 |
| D_ID (Destination ID) | 3 |
| [reserved] | 1 |
| S_ID (Source ID) | 3 |
| TYPE (Data Type) | 1 |
| F_CTL (Frame Control) | 3 |
| SEQ_ID (Sequence ID) | 1 |
| DF_CTL (Data Field Control) | 1 |
| SEQ_CNT (Sequence Count) | 2 |
| OX_ID (Originator Exchange ID) | 2 |
| RX_ID (Responder Exchange ID) | 2 |
| Parameter | 4 |

The header consists of 6 words of 4 bytes each. The "Routing Control" field (first word, first byte) is used with the Type field (discussed below) to identify the function of the frame.

The "Destination ID" field (first word, last three bytes) represents the address of the destination node. The "Source ID" field (second word, last three bytes) represents the address of the source node. The "Data Type" field (third word, first byte) represents the protocol type for the data frames.

The "Frame Control" field (third word, last three bytes) provides indications as to whether the sender is the originator or responder of the exchange, whether it is the first or last sequence, whether sequence initiative is passed, whether the relative offset is in the Parameter field, and how many field bytes there are. This information is primarily used by the microprocessor 44 when processing frames and setting up direct memory access operations in main memory.

The "Sequence ID" field (fourth word, first byte) is a number that uniquely identifies an open sequence for a destination and source node pair.

The "Data Field Control" field (fourth word, second byte) indicates the presence of additional optional headers at the beginning of the data field.

The "Sequence Count" field (fourth word, last two bytes) identifies the ordering of frames within a sequence starting with "000" and incrementing by "1" for each frame sent.

The "Originator Exchange ID" field (fifth word, first two bytes) is a unique ID number assigned by the originator of an exchange.

The "Responder Exchange ID" field (fifth word, last two bytes) is a unique ID number assigned by the responder of an exchange.

The "parameter" field (sixth word) performs various functions depending on the type of the frame, and the type of device involved in the exchange.

In an arrangement of the type illustrated in FIGS. 1 and 2, the present inventors have recognized that it would be desirable to reduce the processing load on the microprocessor 44 (FIG. 2). With reduction in the processing load it may be possible to obtain an improvement in performance, yielding faster processing and a higher frame rate. Also more processor cycles may be available for other tasks. Alternatively, or in addition, the processor clock rate may be reduced, allowing for use of a cheaper, simpler processor having less cache and consuming less power.

BRIEF SUMMARY OF THE INVENTION

An aspect of the invention provides, in a network of computers having a dedicated storage network for retrieving data from storage, a method of processing packets received on the storage network. The method includes the step of storing a sequential indicator for indicating the sequence of the current frame within a set of frames.

The method may include comparing a header field of the current frame with a header field of the previous frame, and generating the sequential indicator on the basis of a result of the comparison. The compared header fields may be indicative of respective originator exchange ID's of the current frame and the previous frame. In addition, or alternatively, the compared header fields may be indicative of respective responder exchange ID's of the current frame and the previous frame. In addition, or alternatively, the compared header fields may indicate respective source nodes of the current frame and the previous frame and/or respective sequence ID's of the current frame and the previous frame and/or respective sequence counts of the current frame and the previous frame.

The comparing step may include determining whether the header field of the current frame is identical to the header field of the previous frame. Alternatively, or in addition, the comparing step may include determining whether the header field of the current frame differs by one from the header field of the previous frame.

The method according to this aspect of the invention may further include supplying the stored sequential indicator to a frame processing unit.

According to another aspect of the invention, a method of processing incoming data frames in a data communications system is provided. The method includes receiving a plurality of data frames one after the other, comparing a header field of a current frame with a header field of a previous frame, generating at least one bit based on a result of the comparing step, and providing the at least one bit to a frame processing unit.

The generating step may include generating a first bit to indicate that the current frame is of the same exchange as the previous frame, generating a second bit to indicate that the current frame is of the same sequence as the previous frame, and generating a third bit to indicate that the current frame immediately follows the previous frame in the sequence.

The providing step may include storing the at least one bit in a frame buffer, and allowing the frame processing unit to access the stored at least one bit. Alternatively, the providing step may include supplying the at least one bit to the frame processing unit as a sideband signal. The frame processing unit may be a processor that operates under control of a stored program.

According to still another aspect of the invention, an apparatus for processing incoming data frames is provided. The apparatus includes a pre-processing block for receiving data frames, and a frame processing unit coupled to the pre-processing block. The pre-processing block is configured to compare a header field of a current frame with a header field of a previous frame and to provide an output signal to the frame processing unit on the basis of the comparison of the header fields of the current and previous frames. The frame processing unit may include a processor that operates under control of a stored program. The frame processing unit may further include a frame buffer that stores the incoming frames and the output signal, where the frame buffer is accessible by the processor.

The output signal may include respective bits for indicating that the current frame is of the same exchange as the previous frame, indicating that the current frame is of the same sequence as the previous frame, and indicating that the current frame immediately follows the previous frame in the sequence.

According to yet another aspect of the invention, a method of pre-processing an incoming data frame is provided. The method includes comparing an originator exchange ID of the incoming data frame with an originator exchange ID of a previous frame, and comparing a responder exchange ID of the incoming data frame with a responder exchange ID of the previous frame. The method further includes setting a first bit if the originator exchange ID of the incoming data frame is the same as the originator exchange ID of the previous frame and the responder exchange ID of the incoming data frame is the same as the responder exchange ID of the previous frame. The method further includes comparing a source ID of the incoming data frame with a source ID of the previous data frame and comparing a sequence ID of the incoming data frame with a sequence ID of the previous data frame. The method further includes setting a second bit if (a) the first bit is set, (b) the source ID of the incoming data frame is the same as the source ID of the previous frame and (c) the sequence ID of the incoming data frame is the same as the sequence ID of the previous frame. The method further includes comparing a sequence count of the incoming data frame with a sequence count of the previous data frame and setting a third bit if the first and second bits are set and the sequence count of the incoming data frame is greater by one than the sequence count of the previous data frame.

With the present invention, hardware pre-processing of the headers of incoming data frames is performed to reduce the processing burden on the microprocessor which handles the incoming data frames, and to facilitate decision making with respect to the handling of the incoming data frames.

Other objects, features and advantages of the present invention will become more fully apparent from the following detailed description, the appended claims and the accompanying drawings.

DETAILED DESCRIPTION OF THE INVENTION

Figure 2:
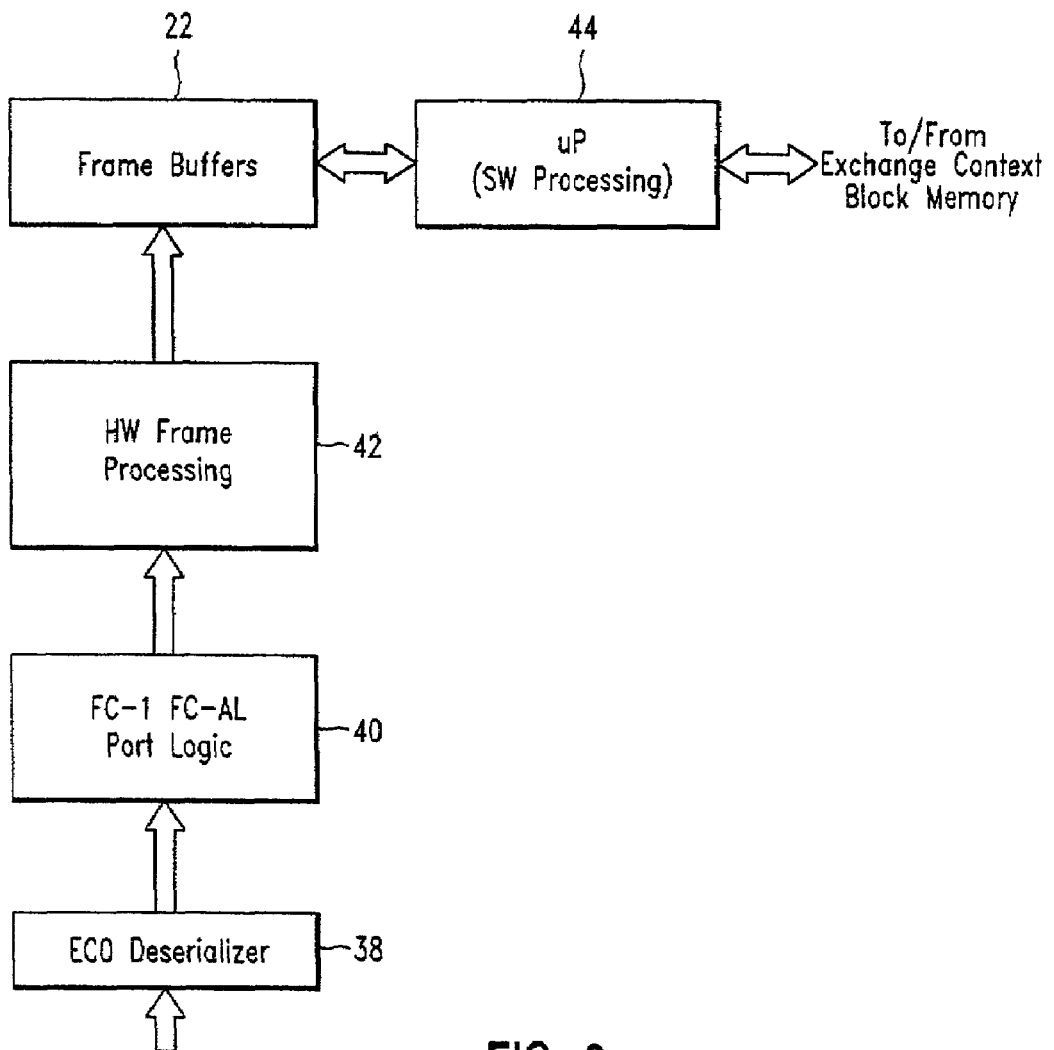
FIG. 2 is a block diagram that illustrates details of the inbound data flow shown in FIG. 1.
Figure 3:
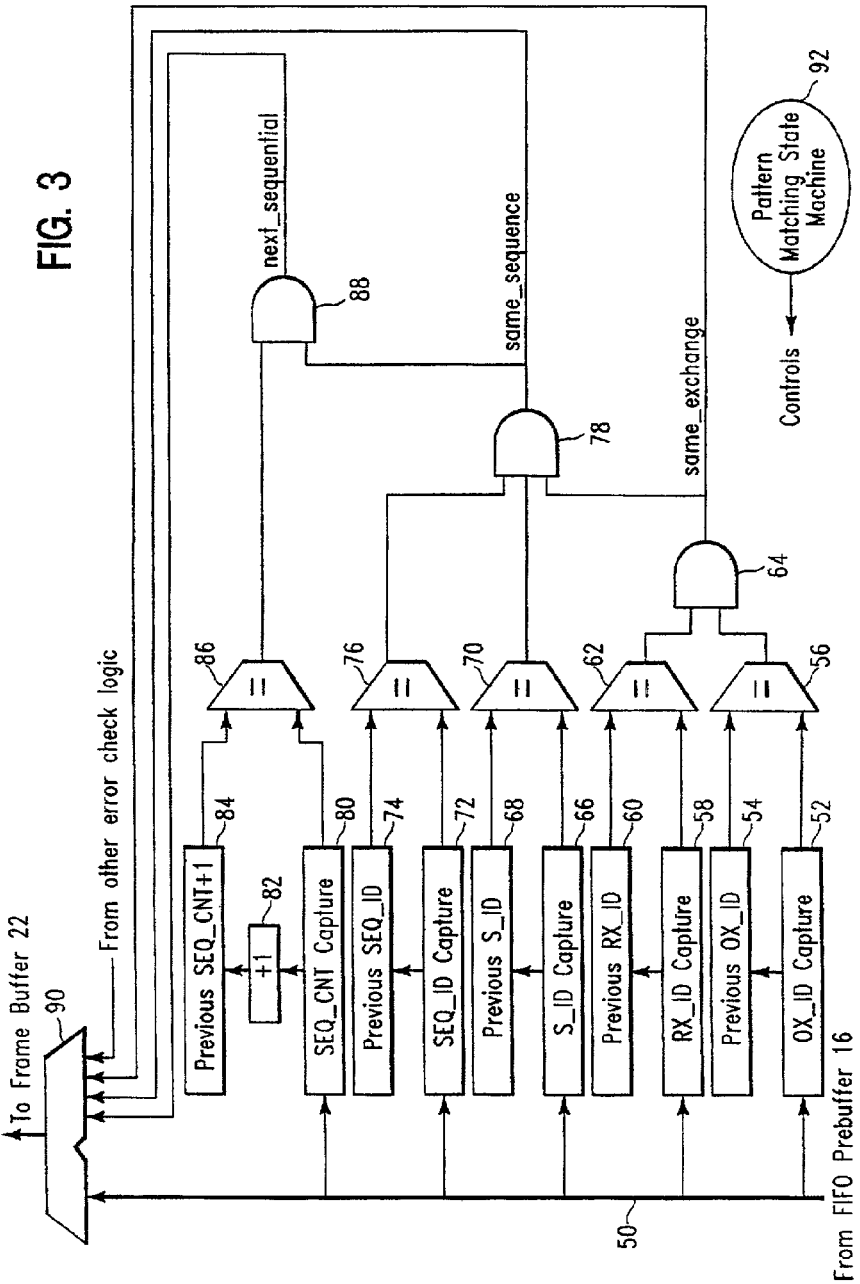
FIG. 3 is a high level logic diagram of circuitry provided in accordance with the invention to pre-process incoming frame headers.

FIG. 3 illustrates, in the form of a high level logic diagram, additional pre-processing circuitry that may be incorporated, in accordance with the invention, in the hardware frame processing block 42 (FIG. 2). The purpose of the circuitry shown in FIG. 3 is to detect patterns in the header data of incoming data frames and to qualify the incoming data frames for suitable handling by microprocessor 44. Other pre-processing logic circuitry of block 42, which performs other functions, such as those described above, is not shown in FIG. 3.

Figure 1:
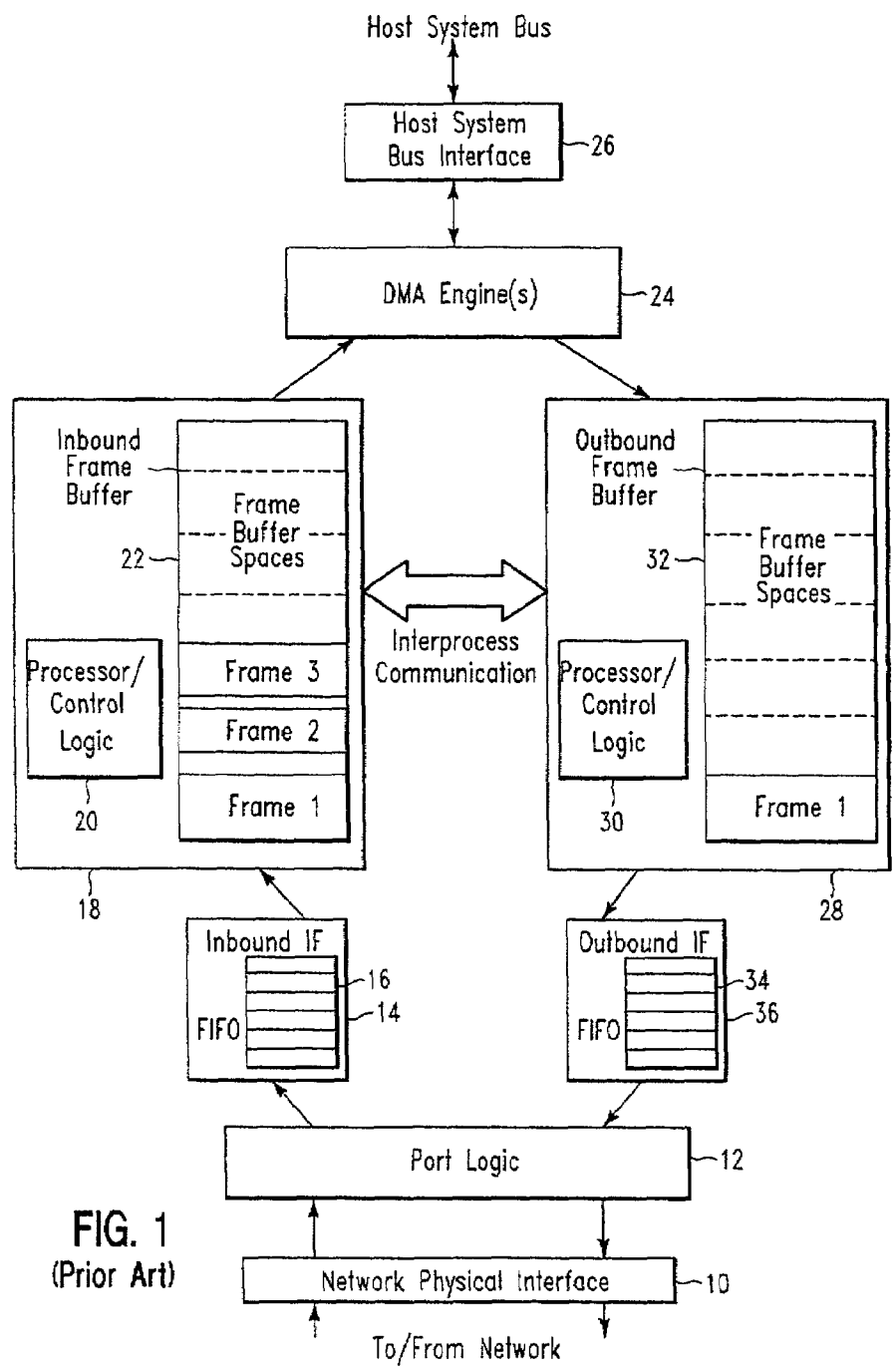
FIG. 1 is a block diagram that illustrates inbound and outbound data flows with respect to a conventional data communication controller.

In FIG. 3, header data for an incoming data frame is received on data bus 50 from FIFO prebuffer 16 (FIG. 1). A block 52 is coupled to the incoming data bus 50 and stores the first two bytes of the fifth word of the header data to capture the Originator Exchange ID of the current incoming data frame. The block 52, and the other storage blocks described herein may be implemented using registers, RAM or the like. Block 54 is coupled to block 52 and stores the Originator Exchange ID for the previous incoming data frame. A comparison block 56 is coupled to blocks 52 and 54 and provides a logical "true" output if the contents of blocks 52 and 54 match. The comparison block 56, and the other comparison blocks described herein, may be implemented, for example using XOR-like functions or similar logic as is known in the art.

A block 58 is coupled to the incoming data bus 50 and stores the last two bytes of the fifth word of the header data to capture the Responder Exchange ID for the current incoming data frame. Block 60 is coupled to block 58 and stores the Responder Exchange ID for the previous incoming data frame. Comparison block 62 is coupled to blocks 58 and 60 and provides a logical "true" output if the contents of blocks 58 and 60 match.

AND gate 64 has two inputs, which are respectively coupled to the outputs of comparison blocks 56 and 62. The output of AND gate 64 sets a "same_exchange" bit when the Originator Exchange ID of the current frame is the same as the Originator Exchange ID of the previous frame and the Responder Exchange ID of the current frame is the same as the Responder Exchange ID of the previous frame.

Block 66 is coupled to incoming data bus 50 and stores the last three bytes of the second word of the header data to capture the Source ID of the current data frame. Block 68 is coupled to block 66 and stores the Source ID of the previous data frame. Comparison block 70 is coupled to blocks 66 and 68 and provides a logical "true" output when the contents of blocks 66 and 68 match.

Block 72 is coupled to incoming data bus 50 and stores the first byte of the fourth word of the header data to capture the Sequence ID of the current incoming data frame. Block 74 is coupled to block 72 and stores the Sequence ID of the previous incoming data frame. Comparison block 76 is coupled to blocks 72 and 74 and provides a logical "true" output when the contents of blocks 72 and 74 match.

AND gate 78 has three inputs, which are respectively connected to the outputs of AND gate 64, comparison block 70 and comparison block 76. AND gate 78 sets a "same_sequence" bit when the "same_exchange" bit is set, the Source ID of the current data frame is the same as the Source ID of the previous frame, and the Sequence ID of the current data frame is the same as the Sequence ID of the previous frame.

Block 80 is coupled to incoming data bus 50 and stores the last two bytes of thefourth word of the header data to capture the Sequence Count for the current incoming data frame. An increment block 82 is coupled to block 80 and adds "1" to the Sequence Count data captured by block 80. Block 84 is coupled to increment block 82 and stores the incremented Sequence Count for the previous data frame. Comparison block 86 is coupled to blocks 80 and 84 and provides a logical "true" output when the Sequence Count of the current data frame is greater by "1 " than the Sequence Count of the previous data frame.

AND gate 88 has two inputs, which are respectively coupled to the output of the AND gate 78 and the output of comparison block 86. AND gate 88 sets a "next_sequential" bit when the "same-sequence" bit is set and the current frame immediately follows the previous frame in the sequence.

By means of a multiplexer 90, the header data received on incoming data line 50 is passed on to the frame buffer 22 (FIGS. 1 and 2) along with the output data from the AND gates 64, 78 and 88 and any other error check output data from the hardware frame processing block 42 (FIG. 2). Alternatively, the data output from the AND gates 64, 78 and 88 may be provided directly as a sideband signal from the hardware frame processing block 42 to the microprocessor 44 (FIG. 2). (Providing the bits generated by AND gates 64, 78 and 88 as sideband signals to the microprocessor 44 may be less desirable because three additional signal traces would be required for the bits and extra logic and wider memory may be required in the processor block.)

A pattern matching state machine indicated at 92 in FIG. 3 and implemented in hardware provides control signals to control the timing of the various logic elements shown in FIG. 3. The implementation of such a state machine would be within the skills of a person of ordinary skill in the art, and is not described herein.

Figure 4:
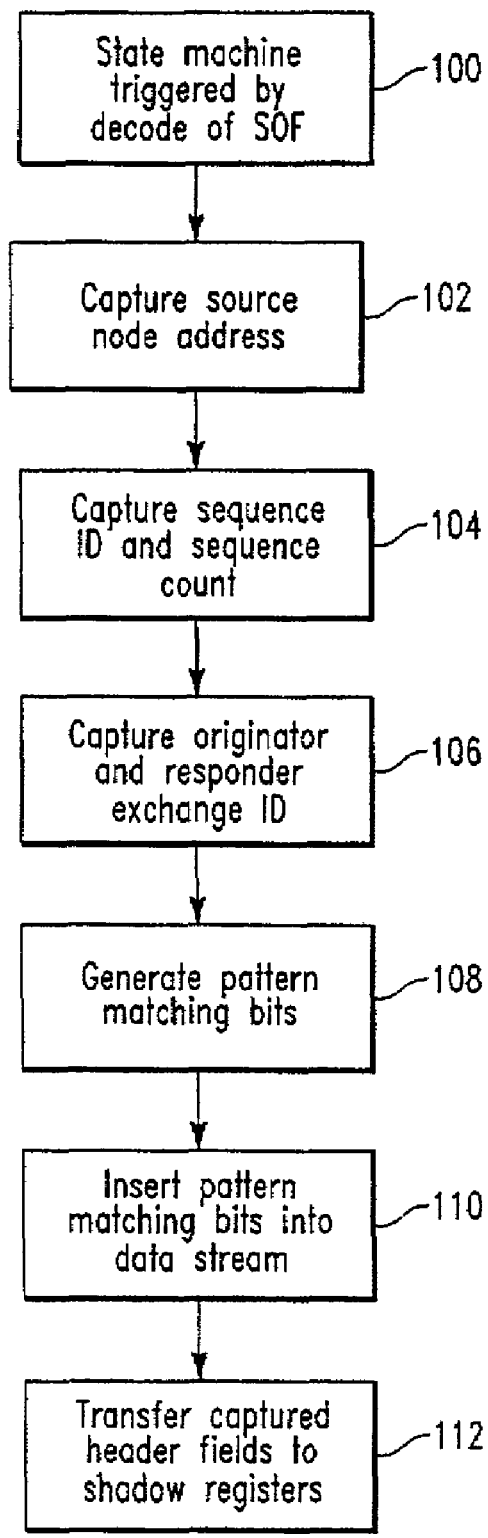
FIG. 4 is a flow chart that illustrates a process carried out in accordance with the invention to pre-process headers of incoming data frames.

FIG. 4 is a flow chart that illustrates a process carried out by the logic circuitry of FIG. 3.

Initially, in block 100 of FIG. 4, the pattern matching state machine 92 (FIG. 3) is triggered by decoding of the start of frame (SOF) sequence of the current incoming data frame. Then, at block 102 in FIG. 4, the source node address of the data frame is captured. Then, at block 104, the sequence ID and sequence count of the data frame are captured. Next is block 106, at which the originator and responder exchange ID's of the data frame are captured. Next, at step 108, the comparison blocks 56, 62, 70, 76 and 86 and the AND gates 64, 78 and 88 operate to generate bits indicative of whether the current incoming data frame is of the same exchange and the same sequence and is the next sequential frame relative to the previous frame ("pattern matching bits").

At block 110 the bits outputted from the AND gates 64, 78 and 88 are inserted as part of an additional header word in the header data that is transferred to the frame buffer 22. Then, at block 112, the header data captured at blocks 52, 58, 66, 72 and 80 is transferred to blocks 54, 60, 68, 74 and 84, respectively. It will be understood that in the case of the transfer from block 80 to 84 the sequence count data is incremented.

Figure 5:
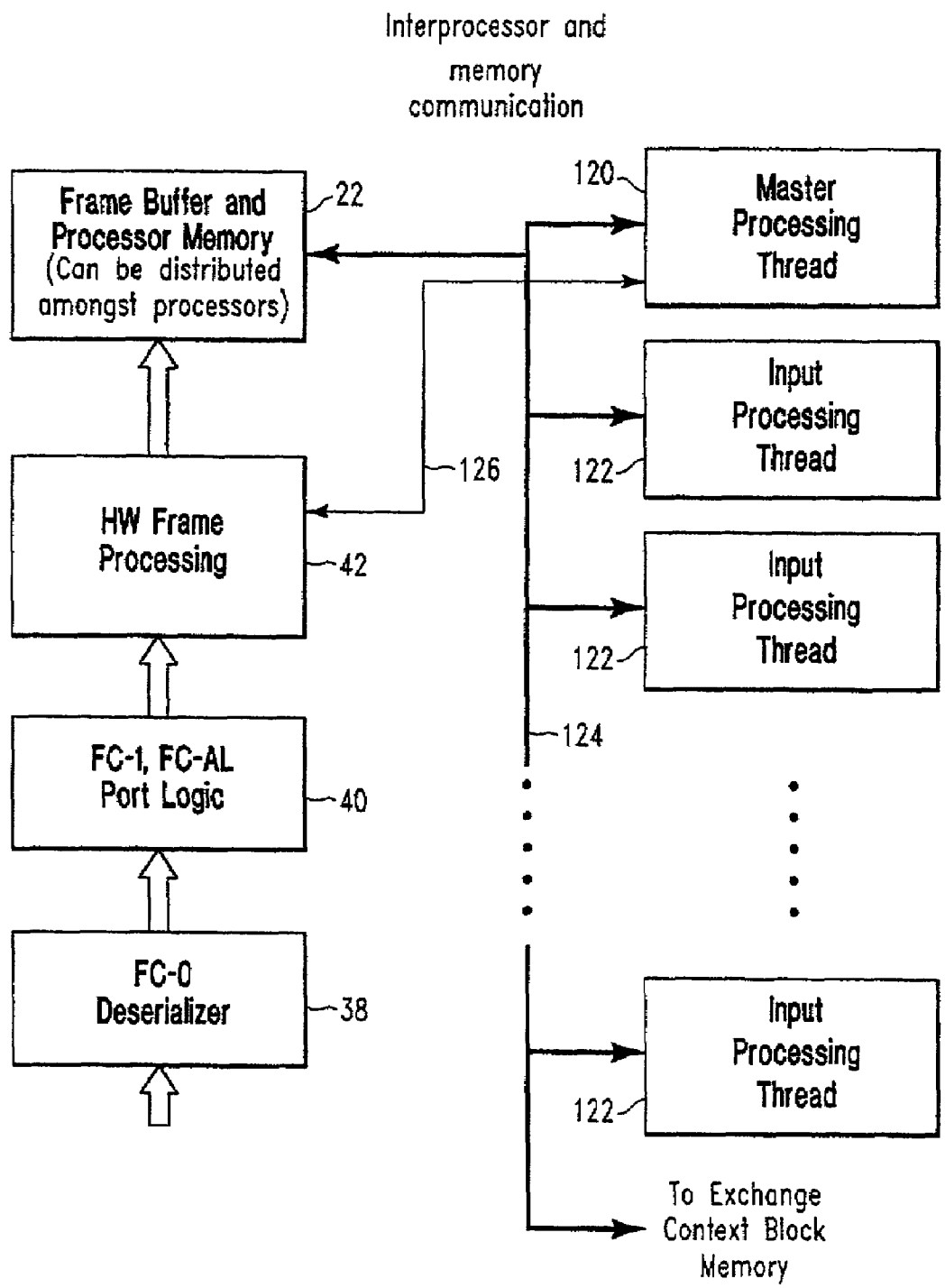
FIG. 5 is a block diagram of an alternative arrangement for processing incoming data frames in which the present invention may be applied.

FIG. 5 is a block diagram representation of an alternative arrangement of an incoming data flow path in which the present invention may be applied. Comparing FIG. 5 to FIG. 2, it will be noted that the same blocks 38, 40, 42 and 22 are present. In accordance with the invention, the header pre-processing logic circuitry of FIG. 3 is incorporated in hardware frame processing block 42. Block 22 indicates that frame buffers may include processor memory, which may be distributed among a plurality of processors.

Instead of the single microprocessor block 44 shown in FIG. 2, the arrangement of FIG. 5 includes a master processing thread unit 120, which manages input processing thread units 122. The plural input processing thread units 122 allow for parallel processing of incoming data frames. The bus 124 allows for communication among frame buffers 22, master processing thread unit 120, input processing thread units 122 and an exchange context block memory (not shown). A signal path 126 is provided between hardware frame processing block 42 and master processing thread unit 120 to allow for exchange of control information such as the "same_exchange" bit.

The "same_exchange", "same_sequence" and "next_sequential" bits provided by the logic circuitry of FIG. 3 may be used to guide the processing performed by microprocessor 44 (FIG. 2) or master processing thread unit 120 (FIG. 5), as the case may be. For example, when the "same_exchange" bit is set, the master processing thread 120 may be programmed to recognize that it is desirable to assign the current incoming data frame to the same input processing thread unit 122 that handled the previous incoming data frame. Also, when that bit is set, the master processing thread unit 120 and/or the microprocessor 44 may recognize that the same exchange context block may be used for the current incoming data frame. Consequently, the master processing thread unit 120 or the microprocessor 44, as the case may be, may refrain from writing the exchange context block to cache until the "same_exchange" bit for the current incoming data frame is read and it is determined that the writing of the exchange context block to cache is necessary. The "same_sequence" bit is provided so that the master processing thread unit 120 or the microprocessor 44 does not need to check the sequence qualifier fields in the header of the current frame. The "next_sequential" bit makes it unnecessary for the master processing thread unit 120 or the microprocessor 44 to check if the current incoming frame is out of order. That bit may also be used in determining which of the frame buffers 22 should be selected to receive data.

Thus, the signals (e.g., the same_exchange, same_sequence and next_sequential bits) provided by the logic circuitry of FIG. 3 lessen the burden on the programmed processor which handles or manages the handling of the incoming data frames. These signals can also be used to promote efficient handling of the incoming data frames.

The foregoing description discloses only the exemplary embodiments of the invention; modifications of the above disclosed apparatus and methods which fall within the scope of the invention will be readily apparent to those of ordinary skill in the art. For example, the present invention has been described in the context of the Fibre Channel communication protocol. However, the present invention is also applicable to any other protocol that combines frames or packets of data into sequences. Other protocols to which the present invention is applicable include Infiniband (described in "Infinibandâ‚¢ Architecture Specification Release 1.0" issued by the Infiniband Trade Association) and Ethernet (described in IEEE Standard 802.3).

While the present invention has been disclosed in connection with exemplary embodiments thereof, it should be understood that other embodiments may fall within the spirit and scope of the invention as defined by the following claims.

What is claimed is:

1. A method of processing incoming data frames in a data communication system, the method comprising the steps of:
   receiving a plurality of data frames one after the other;
   comparing a header field of a current frame with a header field of a previous frame;
   generating at least one bit based on a result of the comparing step; and
   providing the at least one bit to a frame processing unit, wherein generating includes
   generating a first bit to indicate that the current frame is of the same exchange as the previous frame,
   generating a second bit to indicate that the current frame is of the same sequence as the previous frame, and
   generating a third bit to indicate that the current frame immediately follows the previous frame in the sequence.

2. The method of claim 1, wherein the previous frame was received immediately before the current frame.

3. The method of claim 1, wherein the providing step includes storing the at least one bit in a frame buffer, and allowing the frame processing unit to access the stored at least one bit.

4. The method of claim 1, wherein the providing step includes supplying the at least one bit to the frame processing unit as a sideband signal.

5. The method of claim 1, wherein the frame processing unit is a processor that operates under control of a stored program.

6. Apparatus adapted to process incoming data frames, comprising:
   a pre-processing block adapted to receive data frames; and
   a frame processing unit coupled to the pre-processing block;

wherein the pre-processing block is configured to compare a header field of a current frame with a header field of a previous frame and to provide an output signal to the frame processing unit on the basis of the comparison of the header fields of the current and previous frames, and wherein the output signal includes respective bits for
- indicating that the current frame is of the same exchange as the previous frame,
- indicating that the current frame is of the same sequence as the previous frame, and
- indicating that the current frame immediately follows the previous frame in the sequence.

7. The apparatus of claim 6, wherein the frame processing unit includes a processor that operates under control of a stored program.

8. The apparatus of claim 7, wherein the frame processing unit further includes a frame buffer that stores the incoming frames and the output signal, the frame buffer being accessible by the processor.

9. Apparatus adapted to process incoming data frames, comprising:
- a pre-processing block adapted to receive data frames; and
- a frame processing unit coupled to the pre-processing block;

wherein the pre-processing block is configured to compare a header field of a current frame with a header field of a previous frame and to provide an output signal to the frame processing unit on the basis of the comparison of the header fields of the current and previous frames, wherein
- the frame processing unit includes a master processor and a plurality of second processors managed by the master processor, and
- on the basis of the output signal provided by the pre-processing block, the master processor selects one of the second processors to process the current frame.

10. A method of pre-processing an incoming data frame, comprising the steps of:
- comparing an originator exchange ID of the incoming data frame with an originator exchange ID of a previous data frame;
- comparing a responder exchange ID of the incoming data frame with a responder exchange ID of the previous data frame;
- setting a first bit if the originator exchange ID of the incoming data frame is the same as the originator exchange ID of the previous data frame and the responder exchange ID of the incoming data frame is the same as the responder exchange ID of the previous data frame;
- comparing a source ID of the incoming data frame with the source ID of the previous data frame;
- comparing a sequence ID of the incoming data frame with a sequence ID of the previous data frame;
- setting a second bit if (a) the first bit is set, (b) the source ID of the incoming data frame is the same as the source ID of the previous data frame, and (c) the sequence ID of the incoming data frame is the same as the sequence ID of the previous data frame;
- comparing a sequence count of the incoming data frame with a sequence count of the previous data frame; and
- setting a third bit if the first and second bits are set and the sequence count of the incoming data frame is greater by 1 than the sequence count of the previous data frame.

11. The method of claim 10, wherein the incoming data frame is received immediately after the previous data frame.

12. A logic circuit for pre-processing an incoming data frame, comprising:
- first means for comparing an originator exchange ID of the incoming data frame with an originator exchange ID of a previous data frame;
- second means for comparing a responder exchange ID of the incoming data frame with a responder exchange ID of the previous data frame;
- third means, coupled to the first and second means, for setting a first bit if the originator exchange ID of the incoming data frame is the same as the originator exchange ID of the previous data frame and the responder exchange ID of the incoming data frame is the same as the responder exchange ID of the previous data frame;
- fourth means for comparing a source ID of the incoming data frame with the source ID of the previous data frame;
- fifth means for comparing a sequence ID of the incoming data frame with a sequence ID of the previous data frame;
- sixth means, coupled to the third, fourth and fifth means, for setting a second bit if (a) the first bit is set, (b) the source ID of the incoming data frame is the same as the source ID of the previous data frame, and (c) the sequence ID of the incoming data frame is the same as the sequence ID of the previous data frame;
- seventh means for comparing a sequence count of the incoming data frame with a sequence count of the previous data frame; and
- eighth means, coupled to the sixth and seventh means, for setting a third bit if the first and second bits are set and the sequence count of the incoming data frame is greater by 1 than the sequence count of the previous data frame.

* * * * *